(12) United States Patent
Roberts

(10) Patent No.: US 8,770,511 B2
(45) Date of Patent: Jul. 8, 2014

(54) SHORT LANDING AIR VEHICLE BY THE USE OF ROTATING WINGS

(76) Inventor: Jonathan James Roberts, Wantage (GB)

( * ) Notice: Subject to any disclaimer, the term of this patent is extended or adjusted under 35 U.S.C. 154(b) by 128 days.

(21) Appl. No.: 13/361,049

(22) Filed: Jan. 30, 2012

(65) Prior Publication Data

US 2012/0223191 A1 Sep. 6, 2012

(30) Foreign Application Priority Data

Mar. 1, 2011 (GB) .................................... 1103439

(51) Int. Cl.
*B64C 27/22* (2006.01)
*B64C 39/00* (2006.01)

(52) U.S. Cl.
USPC .......................................................... 244/7 A

(58) Field of Classification Search
USPC .................................. 244/2, 7 A, 7 R, 6, 17.11
See application file for complete search history.

(56) References Cited

U.S. PATENT DOCUMENTS

| | | | | |
|---|---|---|---|---|
| 3,884,431 | A * | 5/1975 | Burrell | 244/7 A |
| 7,665,688 | B2 * | 2/2010 | Cylinder et al. | 244/7 A |
| 8,070,090 | B2 * | 12/2011 | Tayman | 244/7 C |
| 8,376,264 | B1 * | 2/2013 | Hong et al. | 244/7 A |
| 2007/0095970 | A1 * | 5/2007 | Richardson | 244/7 A |
| 2010/0230547 | A1 * | 9/2010 | Tayman | 244/7 C |

* cited by examiner

*Primary Examiner* — Isam Alsomiri
*Assistant Examiner* — Valentina Xavier

(57) ABSTRACT

An air vehicle 1 has a port and starboard wing 2 capable of transitioning in mid-flight from fixed to counter-rotation. This generates lift at low airspeeds and enables a short landing to be performed without the need for a runway. The counter rotating wings are intermeshed at 90 degrees and angled slightly to avoid collision. Deployable counterweights 5 balance the rotating wings.

1 Claim, 8 Drawing Sheets

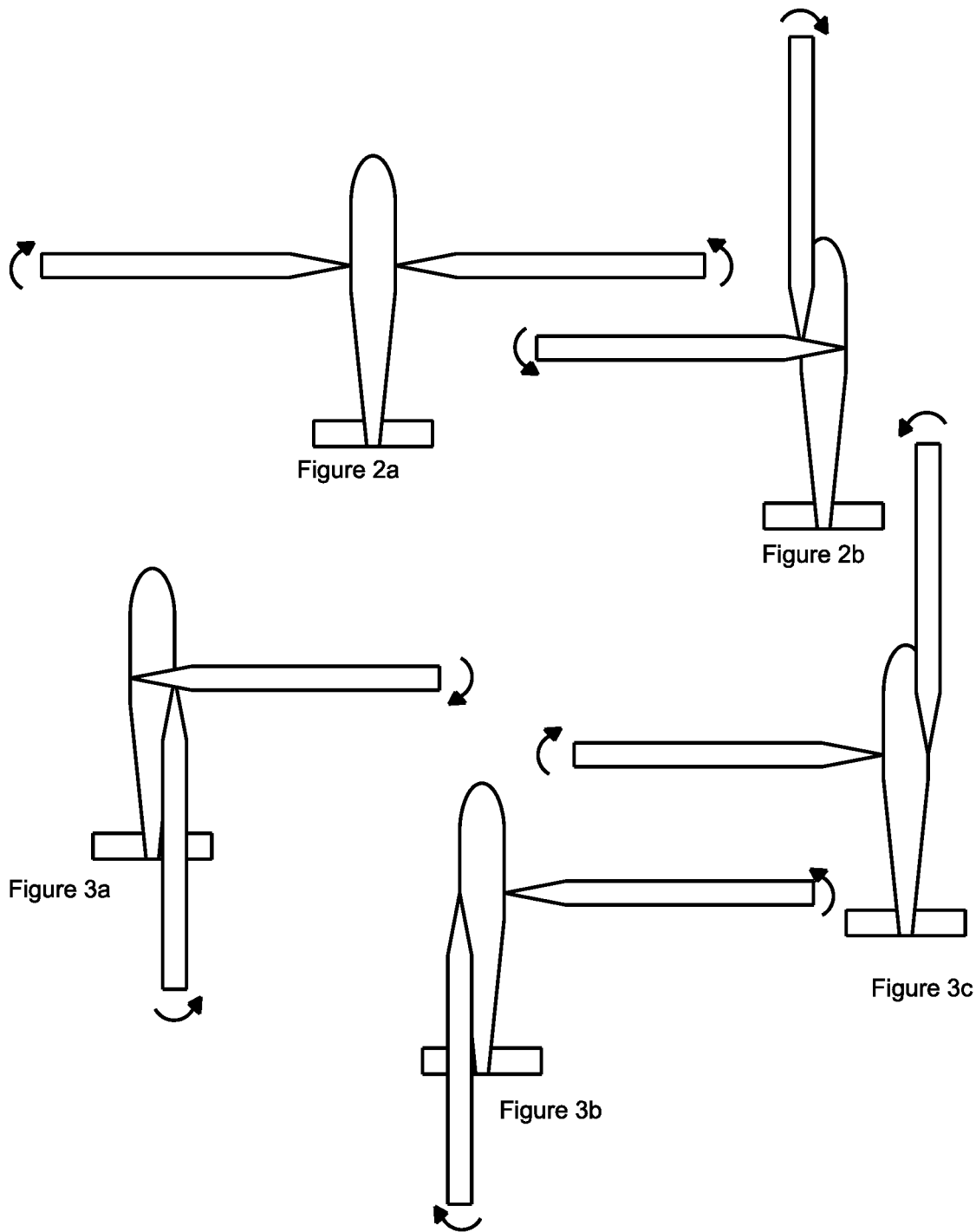

SHORT LANDING AIR VEHICLE BY THE USE OF ROTATING WINGS

CROSS-REFERENCE TO RELATED APPLICATIONS

This application claims the right of priority of the UK application no. GB2488552 filed on 1 Mar. 2011 by the inventor.

FEDERALLY SPONSORED RESEARCH

Not applicable

SEQUENCE LISTING OR PROGRAM

Not applicable

BACKGROUND OF INVENTION

Under certain circumstances the desired destination for an air vehicle lacks a suitable runway. In these situations an air vehicle capable of vertical or very short landing would be an advantage.

Helicopters are capable of vertical take-off and landing. Helicopters use rotary wings powered by an engine through a gearbox. This results in a complex system limiting useful load, and range and increasing costs when compared to a fixed wing airplane.

A helicopter powers its rotor from an engine whereas an auto-gyro spins its rotors by an external upward airflow passing through the rotor. This can be achieved by either forward flight with the rotors tilted backwards using a separate propulsion unit or by non-powered almost vertical descent that leads to a gentle landing.

The helicopter and auto-gyro have a limited maximum forward speed due to the asymmetric lift between a retreating blade and an advancing blade. A rotor also generates high aerodynamic drag as compared to an equivalent fixed wing aircraft.

An air vehicle that combines the advantages of a fixed wing for cruise with a rotary wing for landing provides an efficient means of air transport for the following (but not limited to) types of aircraft:

I. A military cargo glider where after landing it is discarded.
II. A Navy carrier aircraft where (especially when unmanned) a gentle landing is required but could be reconfigured to take-off using the catapult system.

The Herrick convertible aircraft comprised an upper wing on top of a mast that was locked into position during cruise and when combined with the lower wing operated as a biplane. When the wing was unlocked the top wing was free to rotate as an auto-gyro, reference U.S. Pat. No. 2,699,299.

The rotor was initially powered by rubber bungee cords contained inside each upper wing half, running through an aluminum tube. Prior to take-off, two people rotated the wing twice in the opposite direction to the auto-rotation. The upper wing was then locked in the biplane cantilever wing position. When the pilot released lock during the flight, the bungee cords rotated the wing spun twice at 60 revolutions per minute. The now-spinning wing rotated freely and increased its speed to 220 revolutions per minute in auto-rotation.

This type of approach requires the airflow over one half of the wing being reversed during rotation. To accommodate this bi-directional airflow, the wing section shape is bi-convex or somewhat lenticular. This shape is widely used for supersonic aircraft and missiles but grossly inefficient when used at subsonic speeds.

The following invention allows fixed wing to convert to auto gyrating wings but without the disadvantages of using bi-convex wing shapes.

SUMMARY

It is proposed that an air vehicle comprising a port and starboard wing capable of transitioning in mid-flight from fixed to rotation in opposite directions to generate lift at low airspeed thus enabling a short landing without the need for a runway.

For each rotating wing, a counter weight ensures that the rotation is balanced. The counterweights are stored within the wing during normal flight and deployed in the plane of the rotor during transition. The act of deploying the counter weight spins the rotor from its static position to a rotor speed where the airflow begins to turn the rotor and provide lift.

Both rotors turn in opposite directions. This requires the rotors to be inter-meshed at 90 degrees and set at a slight angle to avoid collision.

The embodiment chosen is based on a military cargo glider because the drawings show the invention in better clarity than a powered aircraft.

Many changes, modifications and substitutions may be made to the following embodiment without departing from the spirit and scope of the invention. The invention is not limited by the following embodiments and their descriptions.

Military Glider

Military operations may require the rapid deployment of a bulky cargo such as armored fighting vehicles (hereafter abbreviated to AFV) over great distances to landing areas that are remote from the sea. In such circumstances deployment by air would be required.

Ideally, military cargo planes would land and then disembark the cargo. However, with no available runway or unfavorable terrain, landing may be impossible.

Cargo pallets and small vehicles can be parachuted from the back of a military cargo plane in flight. Modern large 'wing-type' parachutes accommodate significant loads and are steerable but are still limited to the smallest of AFV.

Most military cargo aircraft can only transport a single AFV in a single flight. Therefore a substantial number of flights would be required in a short period to transport a significant number of AFVs. This requires substantial number of military cargo aircraft which would be costly especially when such deployments are rarely needed.

Although military gliders have given way to modern military transport planes and helicopters, a glider still provides unique advantages.

A military glider can be to be manufactured for the fraction of the cost of a military transport aircraft especially when designed for a single operation and to be flown unmanned using modern avionics. A military glider also lacks engines and fuel tanks which further simplifies design and lowers costs.

A military glider can be towed by numerous types of aircraft such as commercial airliners. The tow aircraft could possibly be lightly modified at a typical maintenance site.

However, a military glider still requires a suitable area to make a standard long landing. Alternatively, retro rockets, drogue parachutes, and other devices provide the means of shortening the landing (arrestor cable for carriers). The abrupt landing results in significant forces that put a large strain on the airframe and on the AFV and may result in equipment damage.

A military glider that transitions to an auto-gyro by converting the fixed wings into counter-rotary wings would be an advantage with regards to soft landings. This embodiment makes reference to such a glider using the following drawings.

DRAWINGS

FIG. 2a shows a top view of the air vehicle during fixed wing flight.

FIG. 2b shows a top view of the air vehicle immediately after transition to rotary wing flight with the port wing processing 90 degrees clockwise and the starboard wing processing by 180 degrees counter-clockwise from the fixed wing position.

FIG. 3a shows a top view of the air vehicle with the port wing processing 90 degrees clockwise and the starboard wing processing 90 degrees counter-clockwise from FIG. 2b.

Figure 4:
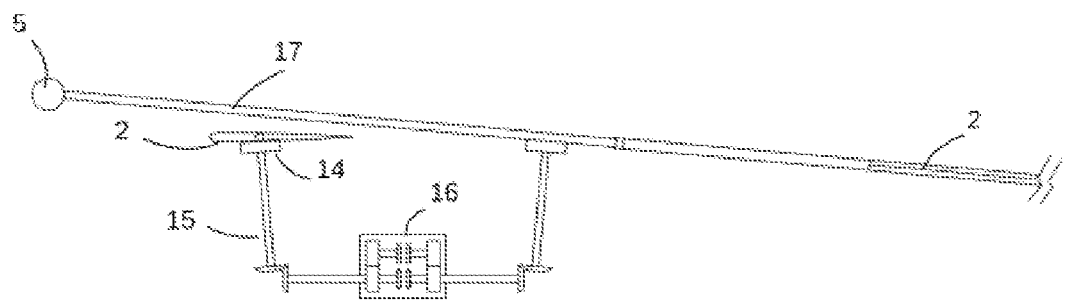

FIG. 3b is a top view of the air vehicle with the port wing processing 90 degrees clockwise and the starboard wing processing 90 degrees counter-clockwise from FIG. 3a FIG. 3c is a top view of the air vehicle with the port wing processing 90 degrees clockwise and the starboard wing processing 90 degrees counter-clockwise from FIG. 3b FIG. 4 is a schematic view of the shaft layout for both the port and starboard wing and their inter-connection.

Figure 5:
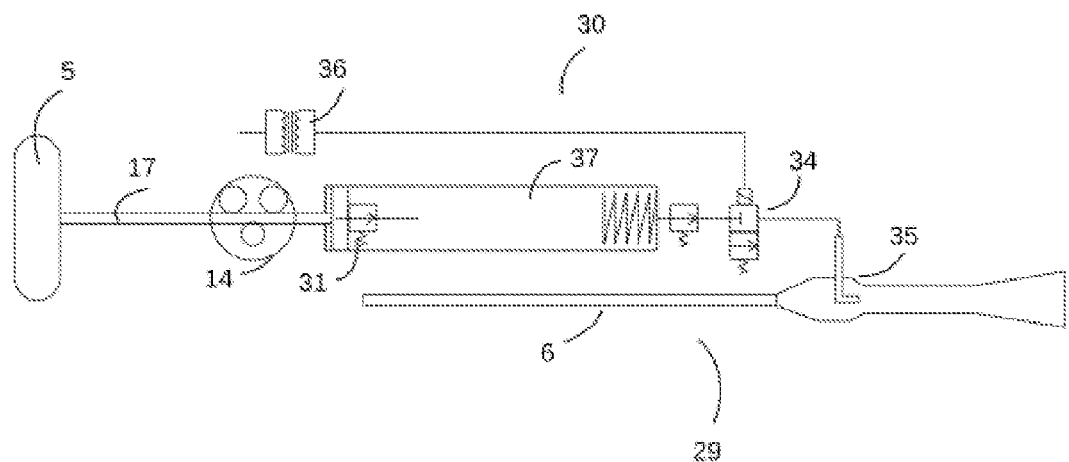

FIG. 5 is a schematic view of the counter weight deployment system and boundary layer lift system.

Figure 6A:
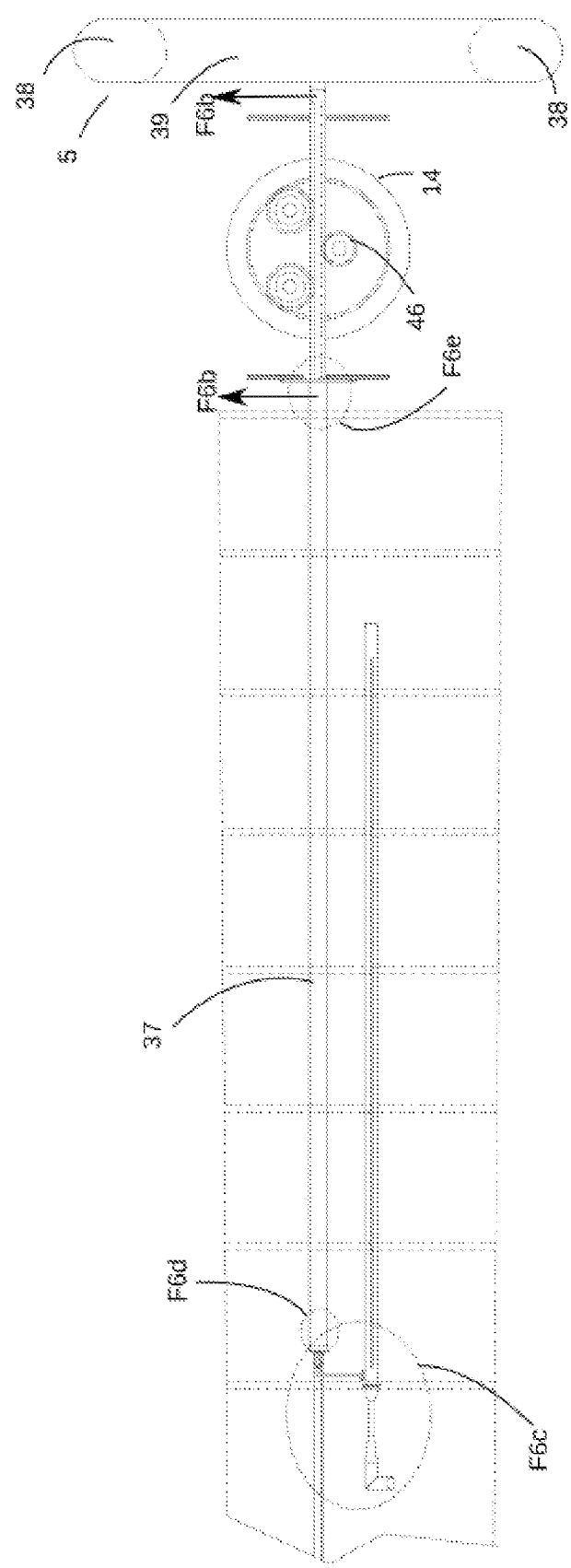
Figure 6B:
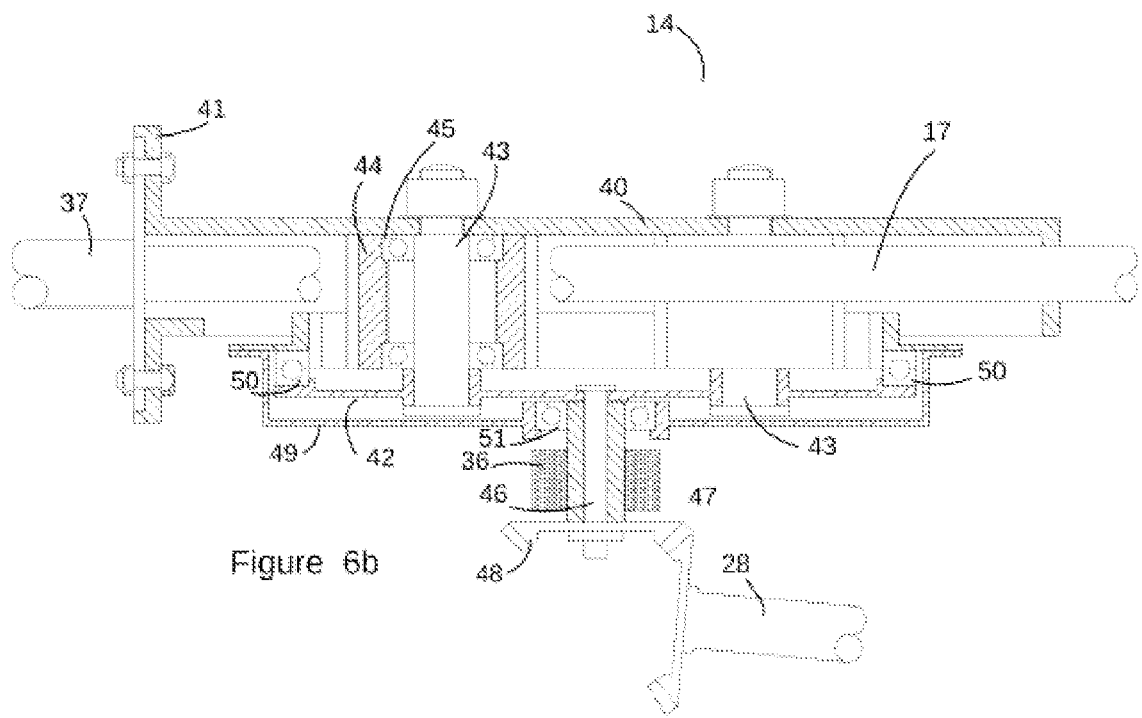

FIG. 6a is a physical view of the counter weight deployment system and boundary layer control lift augmentation system FIG. 6b is a section drawing of the rotor mounting hub and counter weight deployment gears.

Figure 6C:
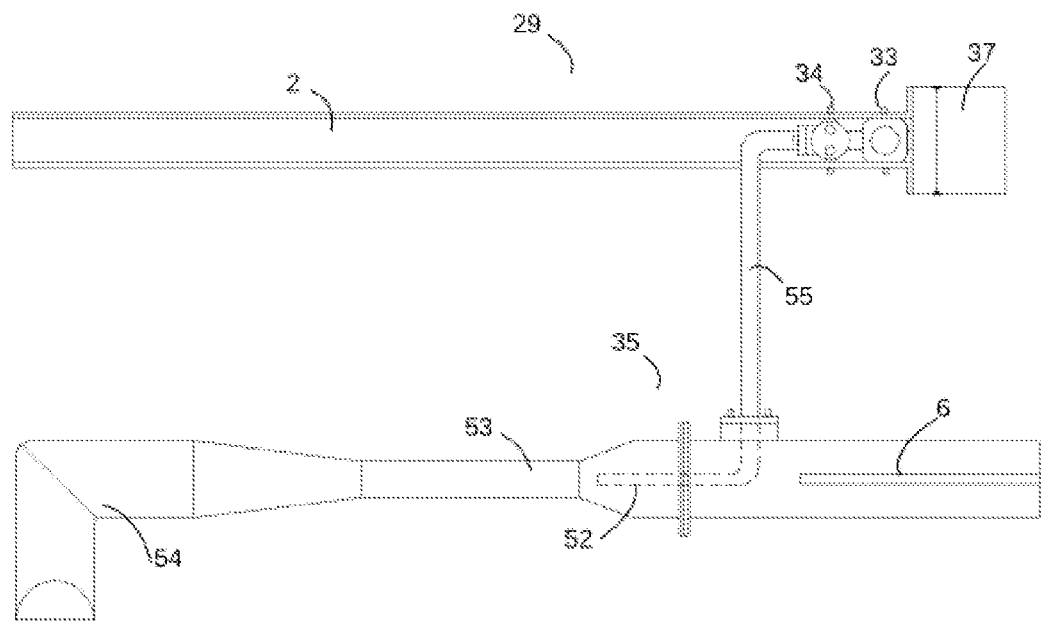

FIG. 6c is a drawing of the boundary layer control system.

Figure 6D:
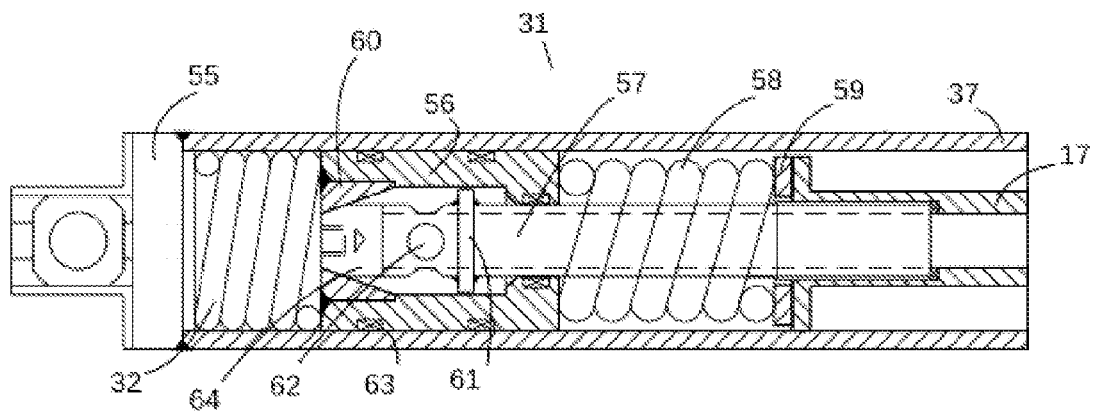

FIG. 6d is a section drawing of the piston and pressure regulator used to deploy the counterweight.

Figure 6E:
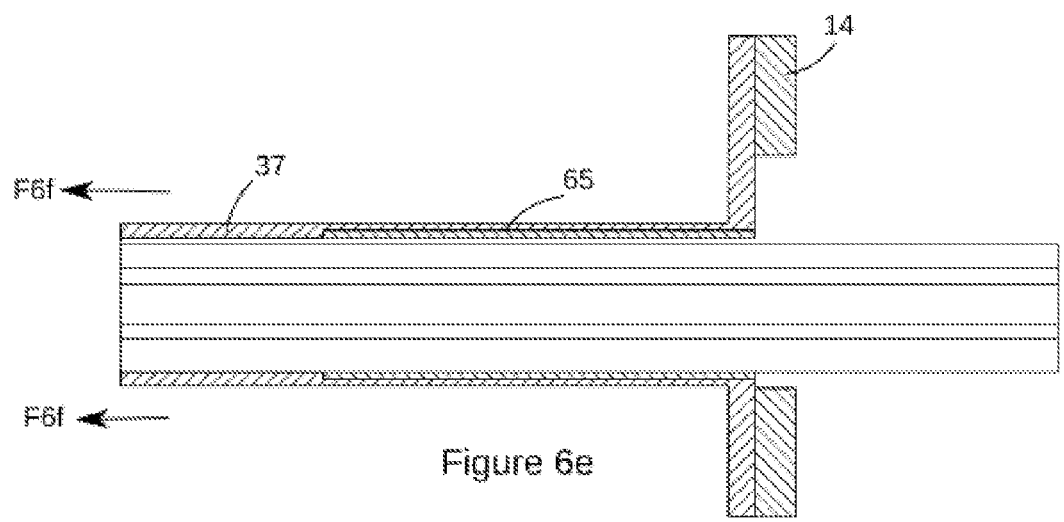

FIG. 6e is a section drawing of the pressure tube used to deploy the counter weight at the end of piston travel.

Figure 6F:
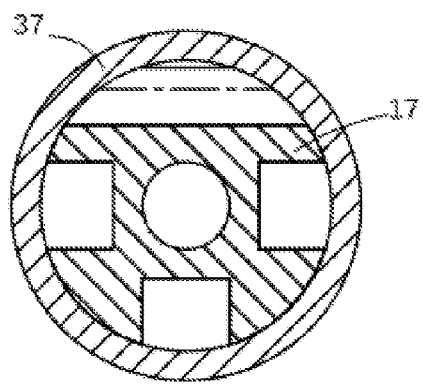

FIG. 6f is a cross section drawing of the counter weight shaft.

Figure 7A:
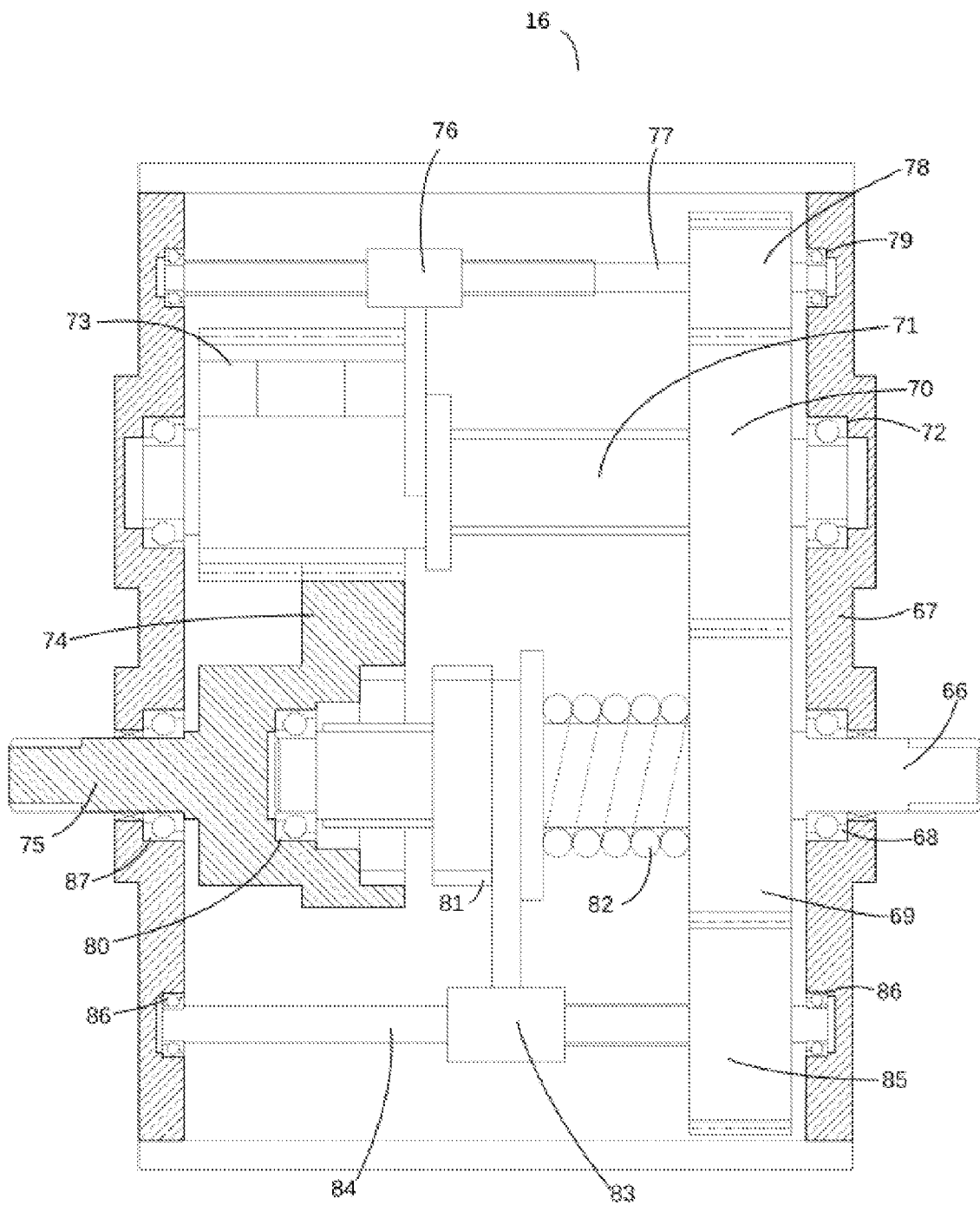

FIG. 7a is a section drawing of the synchronizing gearbox.

Figure 7B:
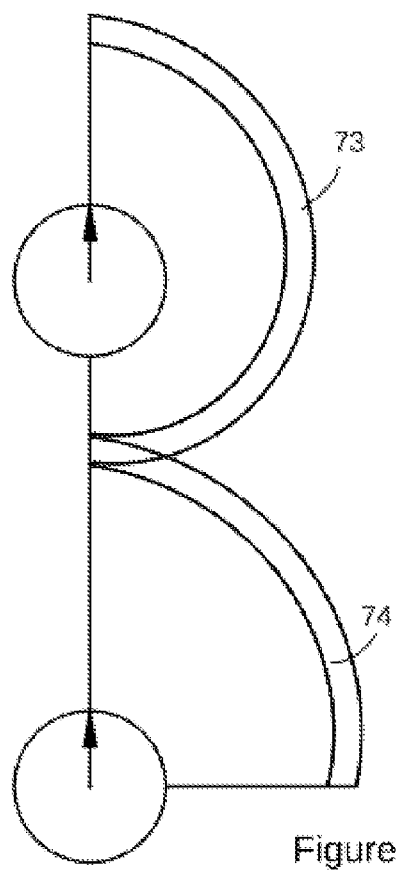
Figure 7C:
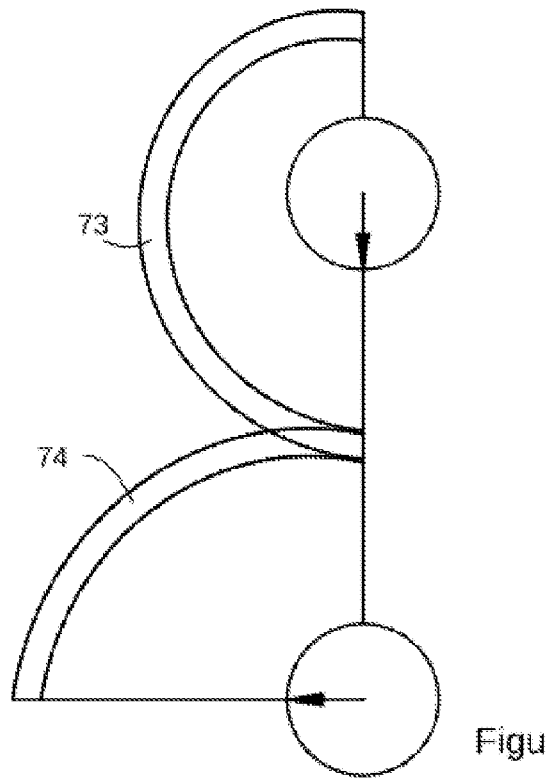

FIG. 7b is a side view of the logarithmic gears at the start (a) and at the end (b) of the transition period FIG. 7c is a side view of the logarithmic gears at the start (a) and at the end (b) of the transition period

DETAILED DESCRIPTION

Figure 1:
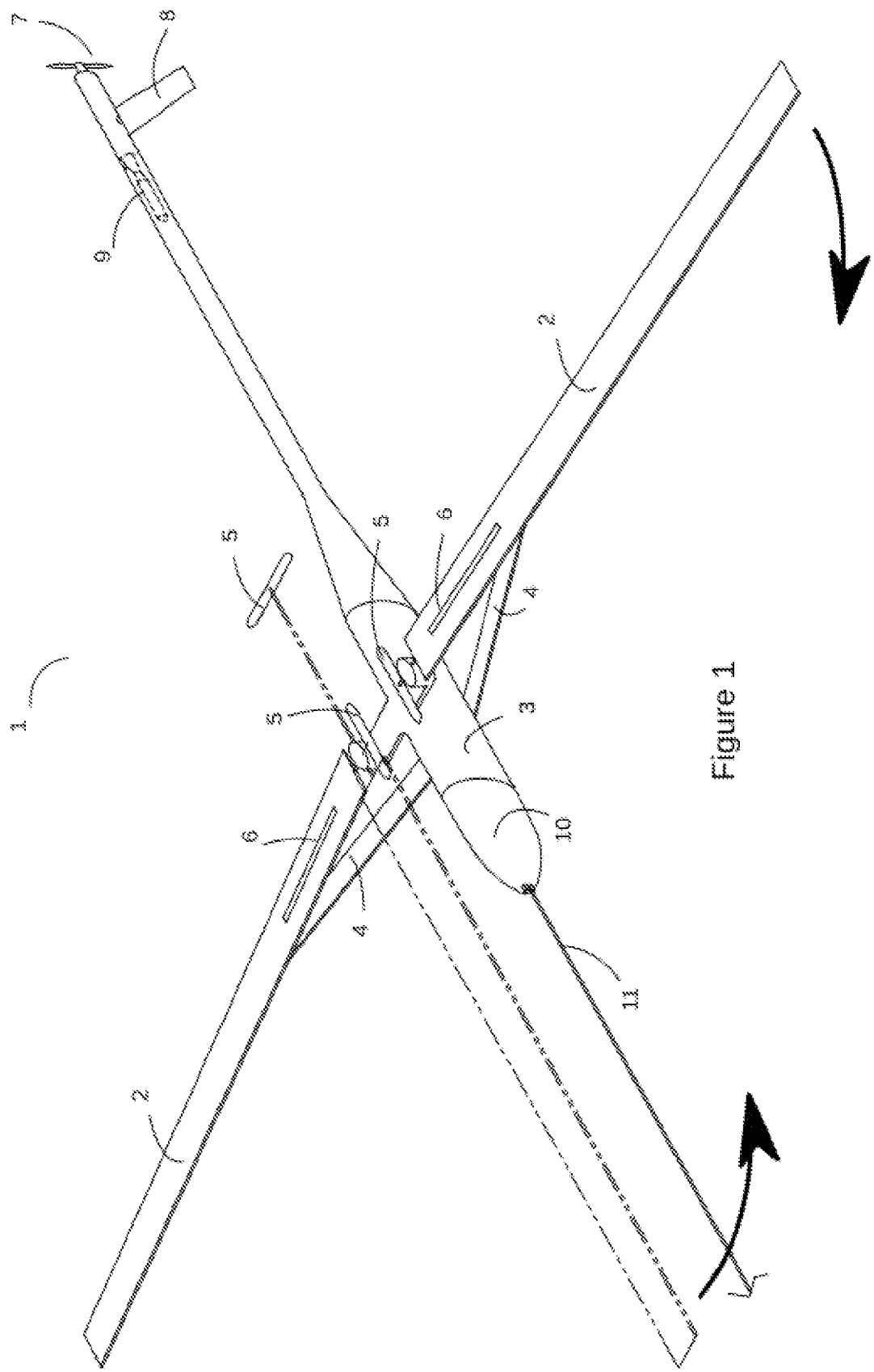
FIG. 1 is an isometric view of the glider.

FIG. 1 shows the glider 1 with its two wings 2 in the high position above the fuselage 3. The wings have a long aspect ratio and a thin chord with a standard airfoil shape for efficient use in both fixed and rotary modes. The wings are shown in the fixed mode with a secondary dashed outline of the starboard wing shown intermeshed to the port wing when one wing is advanced by 90 degrees during the transition period.

Two struts 4 extend upwards from the fuselage 3 and are firmly attached to each wing 2. At the wing roots, two counter weights 5 are shown in their non-deployed position (but shown fully deployed for the dashed starboard wing). The wing incorporates slot 6 that runs along on the top of the wing and is part of the boundary layer control system.

The tail includes two fully actuated fins 8 in a 'inverted V' and a pitch rocket 9. Also a turbine 7 powers the on-board systems.

The front of the fuselage incorporates the nose cone 10 with a tow line 11 that extends to the tow plane.

The long aspect ratio wing reduces drag. The thin airfoil section allows for high speed flight near the transonic region without the need for sweep back. Also the thin airfoil section promotes low-drag laminar flow.

The struts mechanically support the long thin wings whilst minimizing structural weight. The struts also lock the wings into the fixed position during the flight. The transition process from fixed to rotary begins when the strut is commanded to detach from the wing.

The struts act as temporary wings during the transition period where the rotating wings have not gained sufficient speed to provide lift. Although not sufficient to provide level flight, the struts provide stability to the glider through this phase.

The rear fins provide yaw and roll authority to the glider. The fins also provide roll through asymmetric lift caused by the yaw rotation. Furthermore with the fins being below the gliders center of gravity a roll moment is also generated.

The tail is long to allow the fins and the pitch rocket to have a robust momentum arm.

The large wingspan enables the wings to provide sufficient lift at low rotational speeds. An estimated rotation speed of less than 80 rpm has been calculated which is significantly less than traditional auto-gyros and helicopters rotor speed of over 300 rpm. The low rotational speed keeps the centrifugal loads within tolerable limits for the proposed wing structure but sufficient to provide the required stiffness for the wing to behave as an efficient rotor disc.

The auto gyrating wing experiences three separate flow regimes along its length. This is due to the radial change in velocity when combined with the airflow velocity passing through the rotor. At the root of the blade, the combined air velocity results in an angle of attack too high resulting in blade stall. A little further out from the hub the angle of attack results in a resultant force which not only provides lift but also a forward acceleration to the rotor. At the tip, the angle of attack results in a force which again provides lift but this time a braking force to the rotor. In steady flight, the accelerating and breaking forces cancel leaving the wing to spin at a steady speed.

A thin wing section exhibits a maximum lift coefficient less than a standard thicker wing section. As such the stall region during rotation, near the wing root, is more pronounced than would otherwise be. This small loss of lift can easily be re-claimed using boundary layer control and when applied separately to each wing provides roll control during the rotor wing phase.

The slot 6 incorporated in the wing sucks low energy air from the stall region. Energetic air from the main airflow fills the void and allows the flow to 'un-stall' and re-attach to the wing increasing the overall lift of the wing.

The glider proposed here does not comprise pitch or cyclic control but only rigid wings simplifying the design.

With a twin rotor system that has a side by side configuration, the roll moment caused by the asymmetric lift resulting from forward flight is canceled out. High forward speeds during the rotary phase are not expected because transition takes place near the landing site.

As the transition occurs at low speed near the landing site, the pitch control is not warranted. Should an inadvertent pitch down moment occur and the glider picks up speed, the fins 8, now loaded by the airflow, would pitch the glider in the traverse axis to reduce the speed.

However a pitch up provides a significant increase in lift during final landing phase. Therefore a small rocket motor 9 positioned in the tail section ignites just before landing. This pitches the glider upwards producing additional lift by using the kinetic energy in the spinning rotors and in the counter weights.

The boundary layer system 6 when used on either the port or starboard wing causes a roll moment due to uneven lift between the two wings.

The counter rotation of the two wings generates a slight rocking motion diagonal to the body axis but this would be short lived and non-troublesome for unmanned use.

FIG. 2a shows a diagrammatic representation of the wings in relationship to the fuselage. In particular FIG. 2a shows the wing positions fixed to the fuselage geometrically 180 degrees from each other as would be expected in a typical aircraft.

FIG. 2b shows the wing position after the transition to rotary flight. Port wing rotates by 90 degrees clockwise and the starboard wing rotates by 180 degrees counter-clockwise. The advancement of the starboard wing by 90 degrees the over port wing leads to both wings intermeshing which avoids both wings making contact. In one embodiment, this complex change in wing movement maybe achieved using logarithmic gears has shown in FIG. 7.

FIG. 3a shows the port wing processing clockwise and the starboard wing counter-clockwise with both in synchronization; and again from FIGS. 3a to 3b, then to FIG. 3c and back to FIG. 2b. This rotary movement generates lift and is sustained by auto-rotation of the slipstream.

FIG. 4 shows the mechanical layout of the port and starboard wing. FIG. 4 also shows the wing dihedral in relationship to the fuselage. In this particular design, the dihedral is 5 degrees which allows the rotating wing 2 to miss the hub 14 of the adjacent wing. A geared hub 14 attaches the wing to the glider. The counter weights 5 are shown in their extended position. A drive shaft protrudes from each hub to bevel gears 15 that turn the drive perpendicular towards the synchronizing gearbox 16. This arrangement ensures the wings intermesh and avoid hitting each other.

Counter weights 5 opposite each wing cancel the centripetal loads that would cause premature failure to the hub 14. Owing to the size of the wings, the counter weight needs to be at the end of long extension arm 17. To avoid excessive drag during the flight, the extension arm is stored inside the wing and deployed when the glider transitions to rotary wing.

FIG. 5 shows a schematic layout of the counterweight deployment system 30. The pressure cylinder 37 sits inside the wing root and is structurally part of the wing spar. Housed within the cylinder 37 is the counter weight extension arm 17. The counterweight 5 also acts as a pressure vessel storing compressed air that extends down the length of the extension arm 17 to a high pressure regulator 31. A firing spring 32 sits between the extension arm piston and the cylinder end face and keeps the pressure regulator closed during the flight. The extension arm comprises a rack tooth profile that engages the gears of the rotor hub 14.

When the wing detaches from the strut, the firing spring pushes on the extension arm 17 allowing the regulator 31 to pressurize the cylinder 37. The pressure forced the extension arm outwards deploying the counter weight. As the counter weight is deployed the extension arm also drives the gear hub 14 which spins the wing as the annulus of the gear hub 14 is fixed to the fuselage. The wing spins to a suitable speed where aerodynamic auto-rotation begins.

The centripetal force that begins to act on the counter weight and hence further the spin acceleration through the hub 14 is canceled by the opposite force generated by the Coriolis Effect.

FIG. 5 also shows a schematic layout of the boundary layer control system 29 with a low pressure regulator 33, solenoid valve 34 and venturi tube assembly 35 attached to the wing slots 6. A rotary transformer 36 connects the solenoid valve to the cabling inside the fuselage.

FIG. 6a shows the physical layout of both the counterweight deployment system and the boundary layer control system. These two sub-systems are combined into one physical layout.

The pressure cylinder 37 fits inside the wing and is part of the spar. The counter weight 5 incorporates two solid masses 38 made from depleted uranium or tungsten which provide the majority of the counter weight mass to the composite built wing. Sandwiched between the two masses is a high pressure reservoir 39 that provides compressed gas for the counter weight deployment and the boundary layer control system.

The hub 14 is based on an epicyclic gearbox, but here the extension arm replaces the sun gear. The extension arm drives the planetary gears inside the annulus. The annulus remains fixed to the fuselage with the planetary gears rotating the wing.

This arrangement allows the pressure cylinder 37 and hence the wing spar to be in line with the rotation axis of the hub and maximizes the pressure cylinder diameter inside the thin airfoil section. Also the extension arm can better match the wing rotation in displacement and how pressure relates to acceleration.

FIG. 6b shows a cross section of the hub 14. The top housing plate 40 is attached to the pressure cylinder 37 through a bolted flange 41. The top housing is bolted to the bottom plate 42 through three spindles 43. Two of the spindles mount the planetary gears 44 through tapered bearings 45. The third spindle, not shown in this cross section, mounts a guide wheel (ref FIG. 6a) that ensures correct alignment and gear meshing of the extension arm 17 through the hub 14.

A long pin 46 attaches the bottom plate 42 to the output shaft 47. A bevel gear 48 at the end of the output shaft meshes with a perpendicular shaft 28 that allows the transmission straight to the synchronize gearbox. The bottom plate 42 sits inside the fixed annulus ring 49 through two sets of bearings. The larger thrust bearing 50 supports entire load of the glider and is therefore substantial. The smaller tapered bearing 51 is a taper bearing provides lateral support any unbalance loads and negative g loads although these are expected to be small. The extension arm 17 passes through the hub to the counterweight not shown.

The bottom plate also includes the rotary transformer 36 which allows the electrical power from the avionic module to be transmitted across to the rotating wing rotor. The housing is not shown just the inner and outer coils for the purpose of illustration.

FIG. 6c shows the boundary layer control system 29. The boundary control system feeds from the pressure cylinder 37 with the remaining compressed air that has been used to deploy the counter weights.

The boundary control system comprises a low pressure regulator 33, a solenoid valve 34, and a venturi tube assembly 35. The low pressure regulator 33 and solenoid valve 34 are fixed to the wing spar 2 which in turn is bolted to the pressure cylinder 37.

Low pressure air switched on and off by the solenoid valve 34, passes through a connecting pipe 55 and discharges at high velocity from the pressure nozzle 52 into a mixing tube 53 and out through the diffuser 54. This generates a vacuum in slot 6 by means of the venturi effect and thus sucking stagnant air allowing the re-energizing air from the air stream to form an attached boundary layer.

An AC coil when energized operates the solenoid valve 34. A spring returns the valve to the off position when the electrical energy is removed. A rotary transformer 36 (reference FIG. 6) allows the AC electrical power to pass from the fuselage to the rotating wing.

The counter weight pressure cylinder 5 (reference FIG. 6) replenishes the cylinder 37 with compressed air when air is discharged for the boundary layer control system.

FIG. 6d details the high pressure regulator 31 plus the final cross section of the pressure cylinder 37 with its end cap 55. The pressure regulator comprises a piston 56, inner pressure tube 57, and a pressure spring 58 with a washer 59. The inner pressure tube screws directly into the extension arm 17 with the pressure spring between it and the piston. The pressure spring supported by the flange end of the extension arm pushes against the piston 56 and valve seating 60 allowing high pressure air to flow into the air cylinder. When the desired pressure is obtained in the pressure cylinder 37 the spring force is matched and shuts the valve. This regulates the air pressure.

A collar 61 prevents excessive travel of the piston 56 that could block the high pressure holes 62 and eventually stops the piston from dropping of the extension arm.

The outer diameter of the piston 56 and inner diameter of the pressure cylinder 37 provide a clearance fit that allows a trade off between ease of manufacture for the pressure cylinder 37 and the dynamic seals 63 to function correctly. Also the clearance fit keeps the friction between the piston 56 and the cylinder 37 to a minimum during the counter weight deployment.

The clearance fit may result in a small leakage of the compressed air. Although a negligible amount of air would be lost during the short deployment period, the leakage over time would result in a complete discharge of the system. Therefore a separate firing spring 32 sits compressed between the end cap 55 and the piston 56 to ensure that the valve seat 60 pushes firmly against the valve stem 64 thereby sealing the compressed air.

When the wing 2 detaches from the strut 3 (reference FIG. 1), the firing spring 32 pushes the piston 56 and extension arm 17 outwards. This allows the pressure regulator 31 to begin operating and pressurize the cylinder. The compressed air metered into the cylinder at constant pressure through the regulator deploys the extension arm and counterweight.

The pressure regulator 31 resides at the end of the extension and not at the exit point of the counterweight 5. This allows the compressed gas to flow along the narrow passage way inside the extension arm at a higher pressure but with a lower flow velocity minimizing its flow restrictions.

FIG. 6e shows a detailed section of the hub end of the pressure cylinder 37. Here, the pressure cylinder comprises an inner sleeve 65 made from a soft material such as brass. An interference fit exists between the inner sleeve 65 and the piston. FIG. 6f shows a cross section pressure cylinder 37 and counter weight shaft 17 showing the rack gear and groove for the idling wheel.

FIG. 7a shows the cross section of the synchronizing gearbox 16. The gearbox connects and synchronizes the port and starboard wings. In general the synchronizing shaft allows a straight connection between the port and starboard shaft. However at transition between fixed wing and rotary wing the gearbox allows a pair of logarithmic gears, shown in profile in FIG. 7b, to advance one wing by 90 degrees with respect to the other to allow the wings to intermesh with each other.

An input shaft 66 and spur gear 69 mesh permanently with an equally sized spur gear 70 part of a lay-shaft 71. A logarithmic gear 73 meshes with another log-gear 74 attached to the output shaft 75. The profile of gear 74 spirals twice as much as gear 73. This allows gear 74 to rotate by 90 degrees and gear 73 by 180 degrees. A lay-shaft fork 76 pulls the log-gear 73 during transition. The fork 76 fully removes the log-gear clear 63 to avoid a clash between the returning non-circular log-gears. A spring 82 pushes the dog clutch towards the output shaft 75 with fork 83 resisting the spring force. This fork mates with a running shaft 84 through a nut that engages a high helix thread. A pinion gear 85 which meshes with spur gear 69 drives the running shaft 84. Rotation of the running shaft allows the dog clutch 81 to slowly release the spring 82 until the dog clutch engages with output shaft 75.

The invention claimed is:

1. I claim an air vehicle capable of transitioning from fixed wing flight to rotary wing flight comprising:
   a. two hubs positioned at the top or above the air vehicle fuselage with one hub being offset to the port side and the other to the starboard side and both hub axes being fixed and near vertical but slightly inclined from each other,
   b. a port wing attached to the port hub and a starboard wing attached to the starboard hub,
   c. a mechanism to lock both wings to their hubs during fixed wing flight but unlocks at flight transition to allow the port wing to rotate clockwise around the port hub axis, and the starboard wing to rotate counter clockwise around the starboard hub axis as viewed from above said air vehicle,
   d. a mechanism to initiate wing rotation,
   e. counter weights that rotate around the hub axes diametrically opposite to the wings' centre of gravity to minimize unbalanced rotating forces on either hub to within acceptable limits,
   f. a mechanism to advance, during flight transition, one wing against the other wing in the direction of rotation until both wings intermesh spatially with each other, and
   g. a mechanism to maintain aforementioned intermeshing during wing rotation whereby both wings that were previously fixed begin to rotate in opposite directions in a manner that maintains usual leading edge airflow direction for both wings, prohibits wing collision and allows each wing to sweep above its opposite hub thereby allowing said air vehicle to land near vertically within a short distance after fixed wing flight.

* * * * *